(12) United States Patent
Isgar

(10) Patent No.: US 11,368,577 B1
(45) Date of Patent: *Jun. 21, 2022

(54) MESSAGE BACK SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/409,028

(22) Filed: Aug. 23, 2021

Related U.S. Application Data

(63) Continuation of application No. 16/818,991, filed on Mar. 13, 2020, now Pat. No. 11,102,347, which is a continuation-in-part of application No. 16/287,483, filed on Feb. 27, 2019, now Pat. No. 10,715,658, which is a continuation of application No. 15/996,364, filed on Jun. 1, 2018, now Pat. No. 10,257,349.

(60) Provisional application No. 62/588,009, filed on Nov. 17, 2017.

(51) Int. Cl.
*H04M 3/42* (2006.01)
*H04M 3/436* (2006.01)
*H04M 3/424* (2006.01)
*H04M 3/51* (2006.01)

(52) U.S. Cl.
CPC ....... *H04M 3/42195* (2013.01); *H04M 3/424* (2013.01); *H04M 3/42025* (2013.01); *H04M 3/42059* (2013.01); *H04M 3/42348* (2013.01); *H04M 3/5158* (2013.01)

(58) Field of Classification Search
None
See application file for complete search history.

(56) References Cited

U.S. PATENT DOCUMENTS

| | | | |
|---|---|---|---|
| 5,898,770 A | 4/1999 | Valentine | |
| 9,912,688 B1 | 3/2018 | Shaw et al. | |
| 10,110,741 B1 | 10/2018 | Cohen et al. | |
| 10,257,349 B1 | 4/2019 | Isgar | |
| 10,715,658 B1 * | 7/2020 | Isgar | H04M 3/42025 |
| 11,102,347 B1 * | 8/2021 | Isgar | H04M 3/42382 |
| 2009/0238345 A1 | 9/2009 | Cha | |
| 2017/0013122 A1 | 1/2017 | Cohen et al. | |
| 2017/0099388 A1 | 4/2017 | Bensman | |

* cited by examiner

*Primary Examiner* — Harry S Hong
(74) *Attorney, Agent, or Firm* — Schmeiser, Olsen & Watts LLP

(57) ABSTRACT

Disclosed is a message back system that can provide a means for a recipient of robo messages or spam messages to take action. The message back system includes a mobile device operating in conjunction with a server to activate the system and initiate one or more texts to be sent to the source phone number. The server can be programmed to try to send many texts to the source phone number to try to swamp the phone number with texts. The system may provide satisfaction to the user as a tool to respond to these on-going nuisances.

8 Claims, 9 Drawing Sheets

MESSAGE BACK SYSTEM

CROSS REFERENCE TO RELATED APPLICATIONS

This application is a continuation of U.S. patent application Ser. No. 16/818,991, filed Mar. 13, 2020, which is a continuation-in-part of U.S. patent application Ser. No. 16/287,483, filed Feb. 27, 2019, now U.S. Pat. No. 10,715,658, which is a continuation of U.S. Patent Application entitled "TELEPHONE CALL-BACK DEVICE," Ser. No. 15/996,364, filed Jun. 1, 2018, now U.S. Pat. No. 10,257,349, which claims priority to U.S. Provisional Patent Application entitled "TELEPHONE CALL-BACK DEVICE," serial No. 62/588,009, filed Nov. 17, 2017, the disclosures of which are hereby incorporated entirely herein by reference.

BACKGROUND OF THE INVENTION

Technical Field

This invention relates to a text messaging system, and specifically to a system which sends return messages to the source of robo messages or spam messages.

State of the Art

Robo messages are text messages initiated by computers and/or autodialers. The recipient may receive a computer-generated message which is typically an unwanted text message. Spam messages are likewise unwanted and may be a form of robo message or may be sent by a human. These robo messages and spam messages are very annoying because of their frequency and the inability of the recipient to get the messages to stop.

Accordingly, what is needed is a device that initiates one or more return messages being sent to the source of robo messages or spam messages.

DISCLOSURE OF THE INVENTION

The disclosed invention relates to a system which sends return messages to the source of robo messages or spam messages.

Disclosed is a telephone call-back device comprising: an activation device coupled to a VOIP line and VOIP device; a call source utility coupled to the activation device, wherein the call source utility identifies a source phone number of a spam incoming phone call received by the phone, regardless of whether the spam incoming phone call is answered or not answered, in response to the activation device being activated; and a call-back utility coupled to the call source utility, wherein the call-back utility sends at least one robo call-back outgoing phone call to the source phone number in response to receipt of the spam incoming phone call by the phone.

Disclosed is a message back system comprising: a server having a memory storing source information relating to entities engaged in spam messaging and storing a message back utility with programmed instructions executable by the server; and a mobile device operating a message back application, wherein operation of the message back application couples the mobile device with the server and the message back application includes programmed instructions executable by the mobile device, wherein: the mobile device is programmed to automatically send to the server a source information including a source number associated with a source of spam messages for storage in memory of the server in response to activation of the system by user input on the mobile device; and the server is programmed to store the source information and to generate and send one or more messages to the source number of the source according to predefined preferences.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, in addition to the telephone call-back system discussed below, embodiments of the present invention relate to a system which sends return messages to the source of robo messages or spam messages.

Telephone Call-Back System

A robocall incoming phone call is a call received on a phone that is made by a computer or initiated by a computer. It can be very annoying to receive a robocall incoming phone call. Many robocall incoming phone calls have a computer at the other end, and so there is nobody for the recipient to speak to, no way to tell them to remove your phone number, and no way to stop the robocalls. Disclosed is a telephone call-back device that can provide a measure of satisfaction to the recipient of robocall incoming phone calls. The telephone call-back device includes an activation device, a call source utility, and a call-back utility. The activation device is a button or switch that the user or owner of the telephone call-back device can activate when they receive a robocall incoming phone call. Once the activation device is activated, the call source utility identifies a source phone number of the robocall incoming phone call. The source phone number is the phone number of the source entity that sent the robocall incoming phone call. The call-back utility initiates one or more robo call-back outgoing phone calls to be sent to the source phone number. The call-back utility can be programmed to try to send many robo call-back outgoing phone calls to the source phone number to try to swamp the phone number with robo call-back outgoing phone calls. The robo call-back outgoing phone calls may or may not affect the source entity or the source phone number but may rather be a self-help system that may bring some feeling of satisfaction to the recipient of the robocall incoming phone call. While it is discussed that this is useful for robocalls, it will be appreciated that this system can be used for any annoying or unwanted phone calls from computers or human spammers, so long as such use is within the laws of the land. The use of the system provides consumer satisfaction by calling back in order to deal with nuisance of the robocalls or spam calls in that there is an activity for them to respond.

Figure 1:
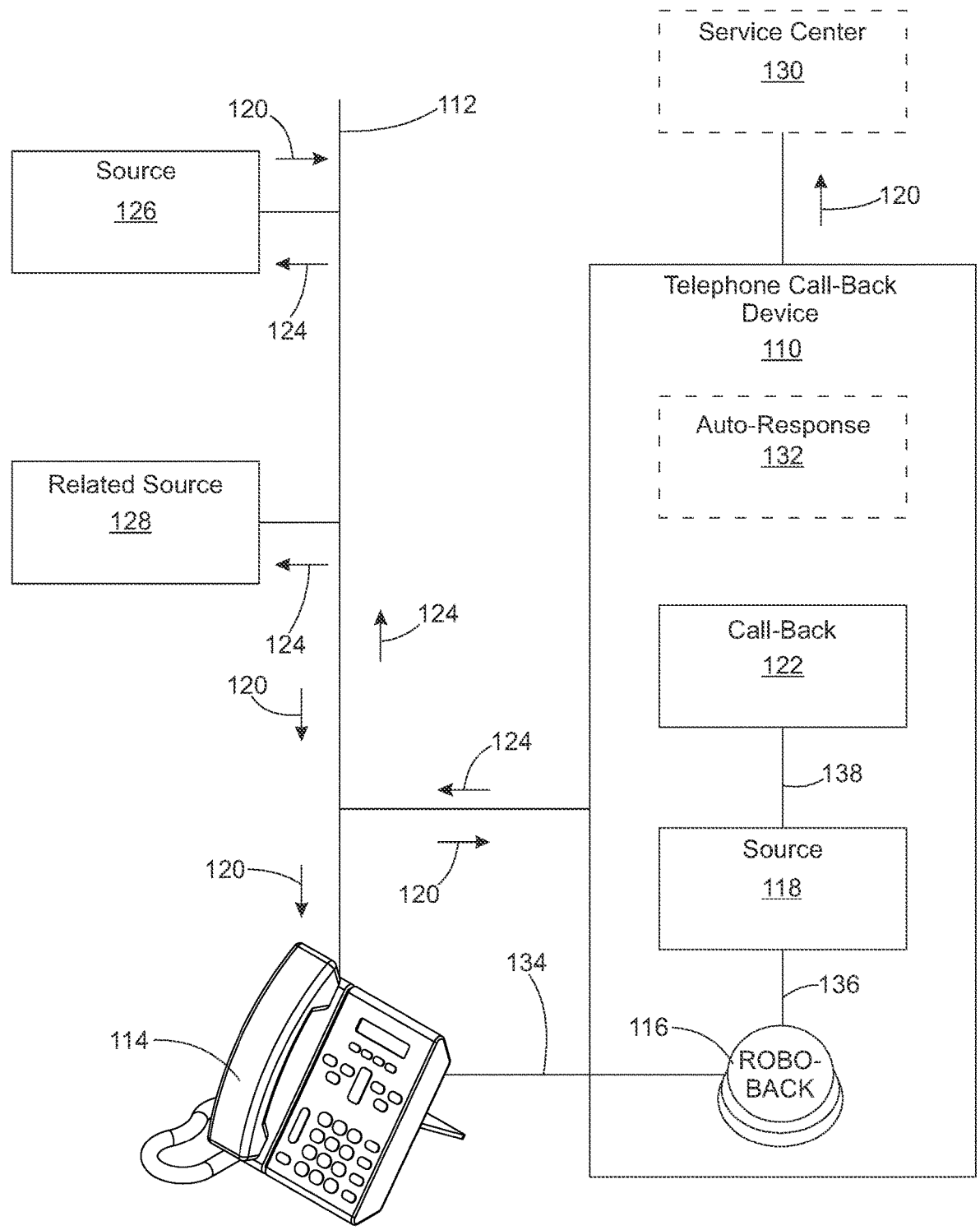
FIG. 1 shows a simplified diagram of a telephone call-back device coupled to a phone, according to an embodiment.

FIG. 1 shows a simplified block diagram of a telephone call-back device 110 coupled to a phone 114. Telephone call-back device 110 includes an activation device 116, a call source utility 118, and a call-back utility 122.

Figure 3:
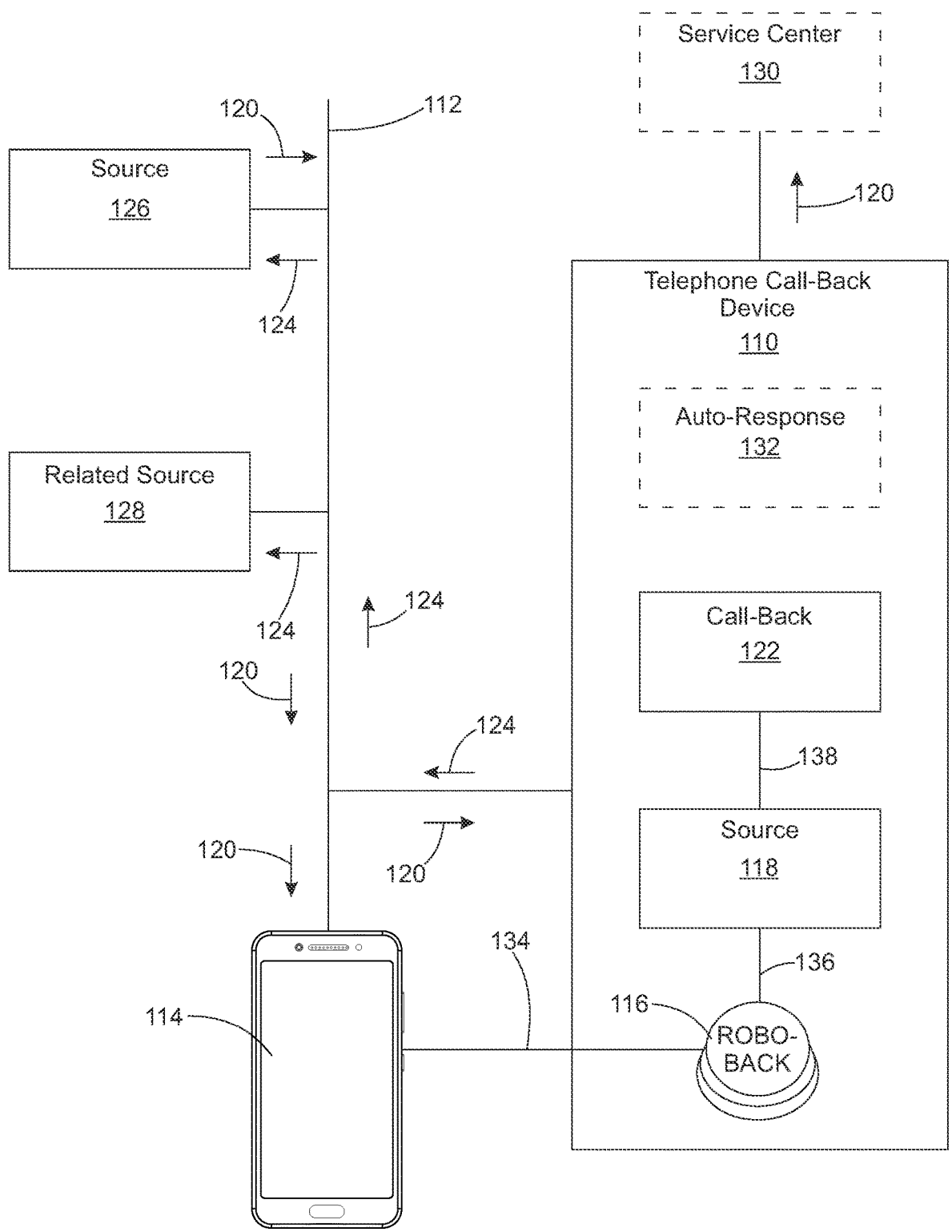
FIG. 3 shows a simplified diagram of a telephone call-back device coupled to a phone, according to an embodiment.

Telephone call-back device 110 and phone 114 are both coupled to a phone line 112. Phone line 112 is a communication link that conducts phone calls to phone 114. In this embodiment, phone 114 may be a landline phone, and phone line 112 is a wired communication link (a landline), but this is not meant to be limiting. In some embodiments, phone 114 may be a VOIP phone or device and phone line 112 is an Internet connection that may be a wired or wireless connection to a network and include all of the technology necessary to operate a VOIP phone or device. In some embodiments, phone 114 is a smartphone as depicted in FIG. 3 and phone line 112 is a wireless communication link. Telephone call-back device 110 is a device that contains software, hardware, and firmware, in this embodiment, but this is not meant to be limiting. Telephone call-back device 110 can be an app on a smartphone with the activation button 116 being a soft-button displayed on the screen of the smartphone as depicted in FIG. 3, for example, or any other combination of software, hardware, and firmware. Embodiments of the invention comprising a smartphone 114 as shown in FIG. 3 are operated in the same fashion as described below, however, the application that performs the operation converts the smartphone into the call-back device 110.

Phone line 112 conducts a robocall incoming phone call 120 to phone 114. Robocall incoming phone call 120 is sent from a source entity 126 having a source phone number. Once a recipient of robocall incoming phone call 120 realizes they have received a robocall, they can activate activation device 116 of telephone call-back device 110 to initiate a response using telephone call-back device 110.

Activation device 116 can be any button or switch or other type of activation device that can be used to begin a process. In this embodiment, activation device 116 is a button that a user will physically press when a robocall incoming phone call 120 is received. Activation device 116 is separate from phone 114 in the embodiment shown in the figures, but this is not meant to be limiting. In some embodiments, activation device 116 is coupled to or a part of phone 114. In some embodiments, activation device 116 is a soft button on a display, or any other type of device that can inform telephone call-back device 110 that the recipient has received robocall incoming phone call 120. In the embodiment shown in the figures, activation device 116 is communicatively coupled to phone 114 using a hardwire communication link 134, but this is not meant to be limiting. In some embodiments, communication link 134 is a wireless communication link. In some embodiments, the activation device may have a display that displays call information, such as the robocall number, whether the number is associated with a spam caller, and the like.

Activation device 116 is a means for the recipient of robocall incoming phone call 120 to begin a sequence for determining who sent the robocall, and then for sending robo call-backs to the source. In some embodiments, activation device 116 can make a beep or a noise on phone line 112 that can be used to annoy humans who are involved in sending robocall incoming phone call 120. Activation device 116 is a push button in the embodiment shown in the figures. When the recipient pushes activation device 116, telephone call-back device 110 is informed that the recipient has received a robocall incoming phone call 120.

Once activation device 116 is activated, call source utility 118 determines the source phone number of robocall incoming phone call 120. Call source utility 118 is communicatively coupled to activation device 116 using a communication link 136. The source phone number is the phone number of source entity 126 that sent robocall incoming phone call 120. In some embodiments, call source utility 118 determines one or more related phone numbers. Related phone numbers are other phone numbers used by source entity 126, or phone numbers for related source entities 128. Related source entities 128 are one or more other entities that are related to, owned, governed, or controlled by, source entity 126, for example. Related phone numbers are searched for because often a source entity 126 has multiple numbers associated with it and may have set up multiple companies or entities in an attempt to hide the source of robocalls. Call source utility 118 can be software, firmware, hardware, or any combination of these.

Call-back entity 122 is communicatively coupled to call source entity 118 using a communication link 138, which can be a wired or a wireless communication link. Once call source utility 118 determines the source phone number, call-back utility 122 sends one or more robo call-back outgoing phone call 124 to the source phone number. Call-back utility 122 can be programmed to send a series of robo call-back outgoing phone calls 124 to the source phone number and source entity 126. If one or more related phone number and/or related entities 128 have been identified, call-back utility 122 can send one or more robo call-back outgoing phone call 124 to the related numbers also. The robo call-back outgoing phone calls 124 may or may not cause a distraction or a disruption to source entity 126 or related entities 128, but they can make the recipient of robocall incoming phone call 120 feel like they have done something to push back against robocall incoming phone call 120 and source entity 126. Call-back utility 122 can be software, firmware, hardware, or any combination of these.

In some embodiments, telephone call-back device 110 includes an auto-response utility 132. Auto-response utility 132 will identify known source phone numbers to the recipient as robocall incoming phone call 120 is being received. In this embodiment, the recipient is thus warned beforehand that the incoming call is robocall incoming phone call 120. In this embodiment, once activation device 116 is activated, auto-response utility 132 will answer the call with a robo-answer. Auto-response utility 132 can be software, firmware, hardware, or any combination of these.

In some embodiments, telephone call-back device 110 is communicatively coupled to a service center 130. Telephone call-back device 110 can send the source phone number and/or robocall incoming phone call 120 to service center 130. Service center 130 can log robocalls and, in some embodiments, can initiate processes and procedures to investigate and enforce laws, block calls, or otherwise perform a more comprehensive response to robocall incoming phone call 120.

Figure 2:
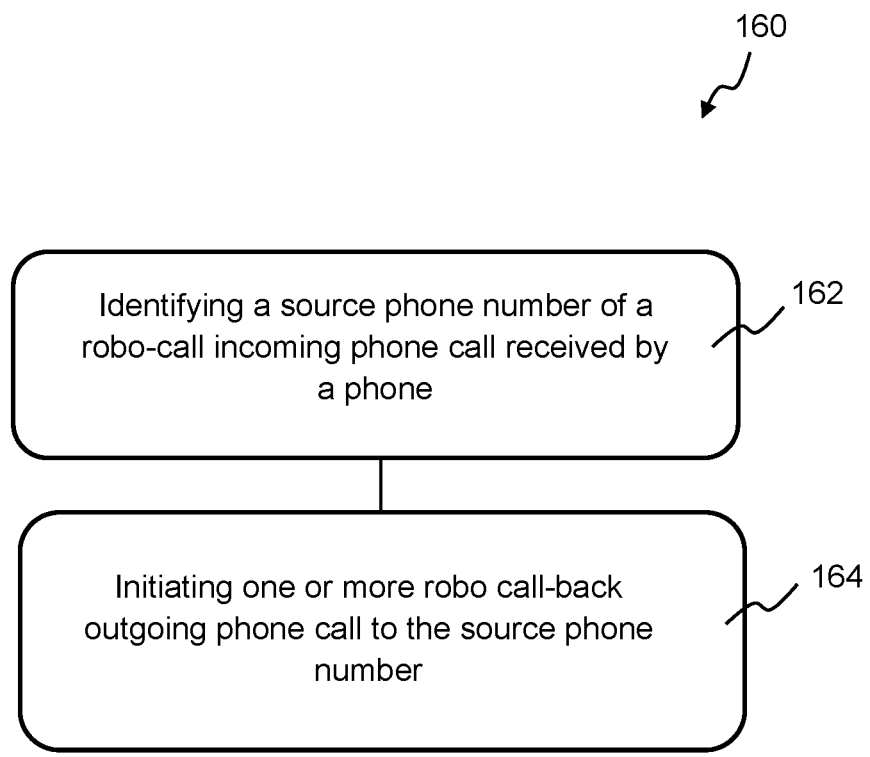
FIG. 2 shows a method of responding to a robocall incoming phone call, according to an embodiment.

FIG. 2 illustrates a method 160 of responding to a robocall incoming phone call. Method 160 includes an act 162 of identifying a source phone number of a robocall incoming phone call received by a phone. The phone can be a landline or a wireless phone.

Method 160 also includes an act 162 of initiating one or more robo call-back outgoing phone call to the source phone number within state regulations. The robo call-back outgoing phone calls may be sent to annoy the source of the robocall incoming phone call and clog the source phone number.

In some embodiments, method 160 includes determining at least one related phone number, where the at least one related phone number is related to the source phone number. In some embodiments, method 160 includes sending one or more robo call-back outgoing phone call to the at least one related phone number.

In some embodiments, method 160 includes sending the source phone number to a service center. In some embodiments, method 160 includes investigating, by the service center, the source phone number; and taking comprehensive action as a result of the robocall incoming phone call. In some embodiments, method 160 includes providing an investigation report related to the robocall incoming phone call. The report can be provided to the recipient of the robocall incoming phone call, to the police, or another group that can take action.

In some embodiments, method 160 includes providing, by an auto-response utility, an automated call answer to the robocall incoming phone call.

Message Back System

A robo message is a text message received on a mobile device that is made by a computer or initiated by a computer. It can be very annoying to receive a robo message, particularly because it is rarely a single robo message, but rather several robo messages throughout a day. Additionally, spam messages are similarly annoying and spam messages may be produced by a computer or may be produced by a human. Disclosed is a message back system that can provide a measure of satisfaction to the recipient of robo message. The message back system includes a message back application stored and operable on a mobile device that establishes a connection between the mobile device and a server when the message back application is operated by the mobile phone. The message back application may be manually or automatically activated when the mobile device receives a robo message. Once the message back application is activated, a signal is sent to the server to activate a message back operation to send a plurality of messages back to the source identifier of the robo message or spam messages. The source identifier is a phone number, text number, IP address, or the like, of the source entity that sent the robo message or the spam message. This system in another embodiment may operate for use with spam emails wherein the source identifier is an email address, wherein the message back system operates in a manner similar to that of messaging back as described in this application. The source identifier may be saved in the server 214 or, in other embodiments, the source identifier may be automatically sent to a proper entity who fights spam.

Figure 4:
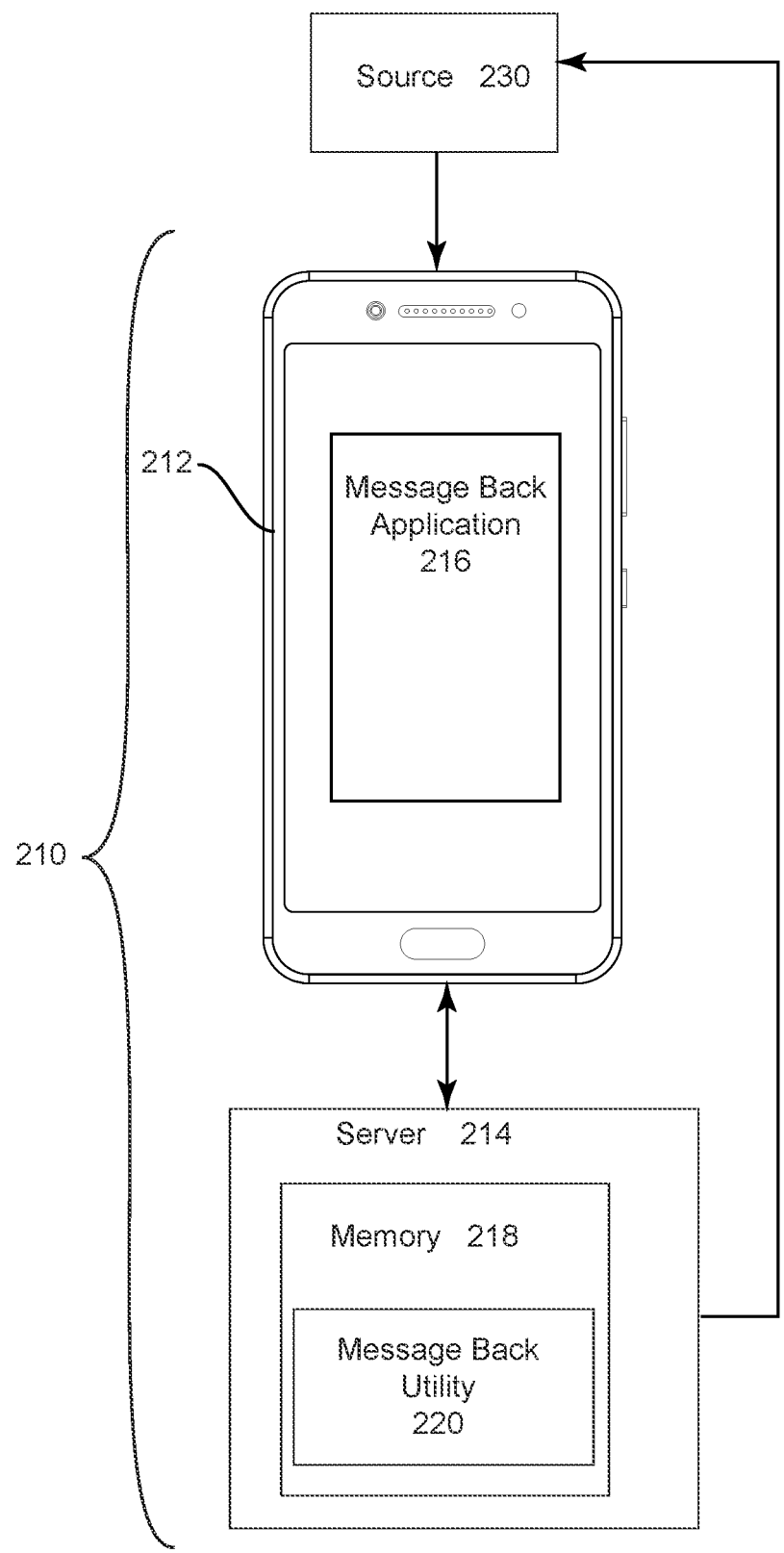
FIG. 4 shows a simplified diagram of a message back system, according to an embodiment.

FIG. 4 shows a simplified block diagram of a message back system 210 that includes a mobile device 212 coupled to a server 214. The mobile device 212 may include a message back application 216 that is stored on memory of the mobile device 212 and operates by use of a processor of the mobile device 212. The operation of the message back application 216 establishes a connection with the server 214, wherein the connection includes a communication connection such as a network connection. The network connection may be a wireless connection, such as, Bluetooth, WiFi, 3G, 4G, 5G and the like. The server 214 may include a memory 218 and a message back utility 220 stored on the memory 218 and operable by a processor of the server 214. It will be understood that the server 214 may be a computer server or may be a cloud server architecture. The mobile device 212 may be smartphone, a tablet, a laptop or the like.

Figure 5:
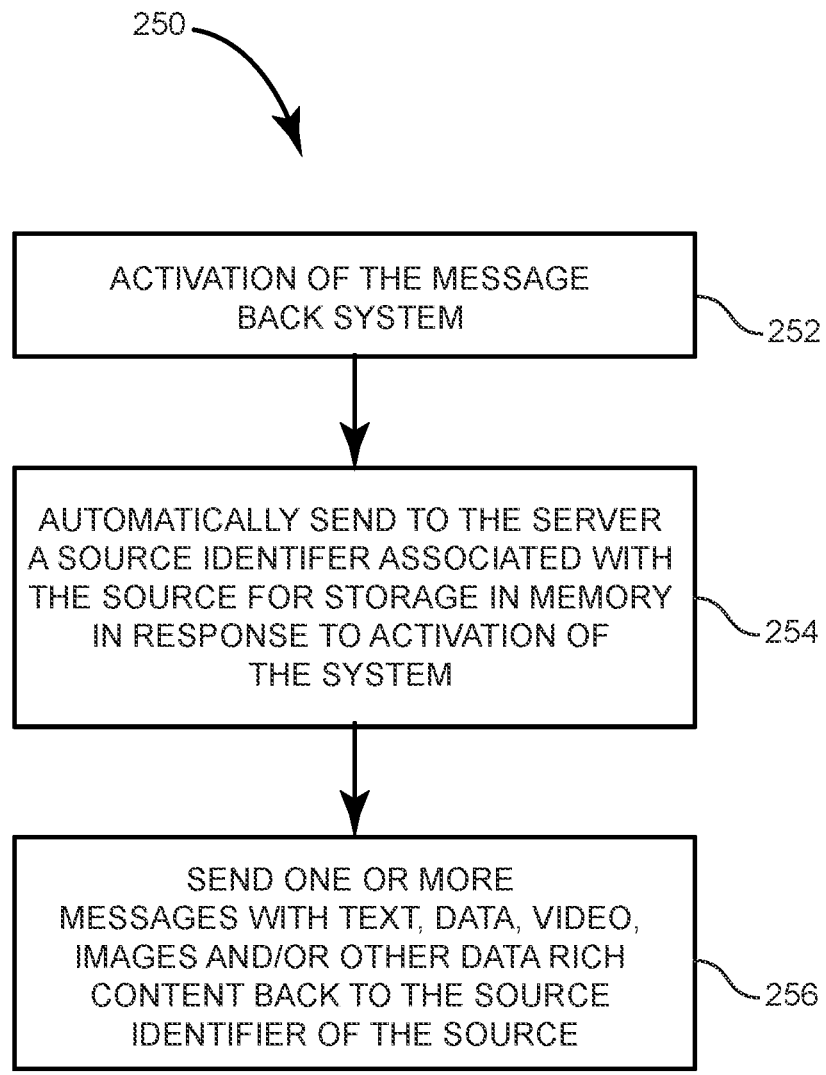
FIG. 5 shows a method of operating a message back system, according to an embodiment.

Referring additionally to FIG. 5, the system 210 may operate wherein the mobile device 212 receives a robo message or a spam message from a source 230 having a source number that sent the robo message or spam message. The system 220 may include programming on the mobile device 212 in the form of message back application 216 and programming on the server 214 in the form of message back utility 220 that operates together in order to perform the method 250 of operation of system 210. The user may activate message back application 216 after receiving a robo message or a spam message from the source 230. Method 250 may include activation of the message back system 210 (Step 252), wherein activation may include pressing a soft-button on the screen of the mobile device 212. Method 250 may include the mobile device 212 programmed in the message back application 216 to automatically send to the server 214 a source number associated with the source 230 for storage in memory 218 in response to activation of the system (Step 254). The method 250 may further include the server 214 being programmed in the message back utility 220 to send one or more messages back to the source number of the source 230 (Step 256). In some embodiments, the system 210 may operate to send a notification from the server 214 to the mobile device 212 wherein the notification may be an audio alert, a visual alert, a vibration alert or combinations thereof.

Figure 6A:
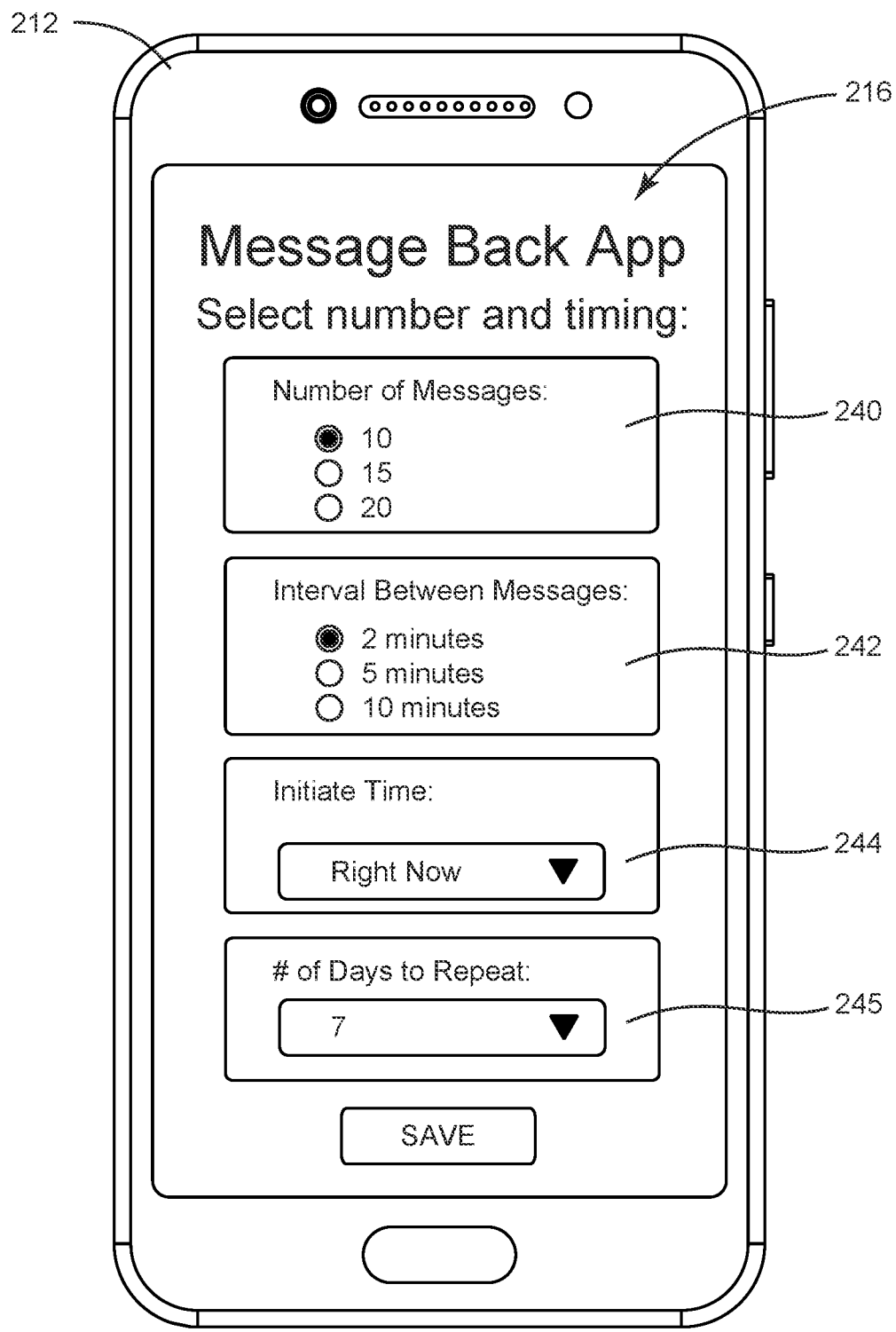
FIG. 6A shows a front view of a mobile device utilizing a message back application of a message back system for selecting time and amount of messages to send back, according to an embodiment.
Figure 6B:
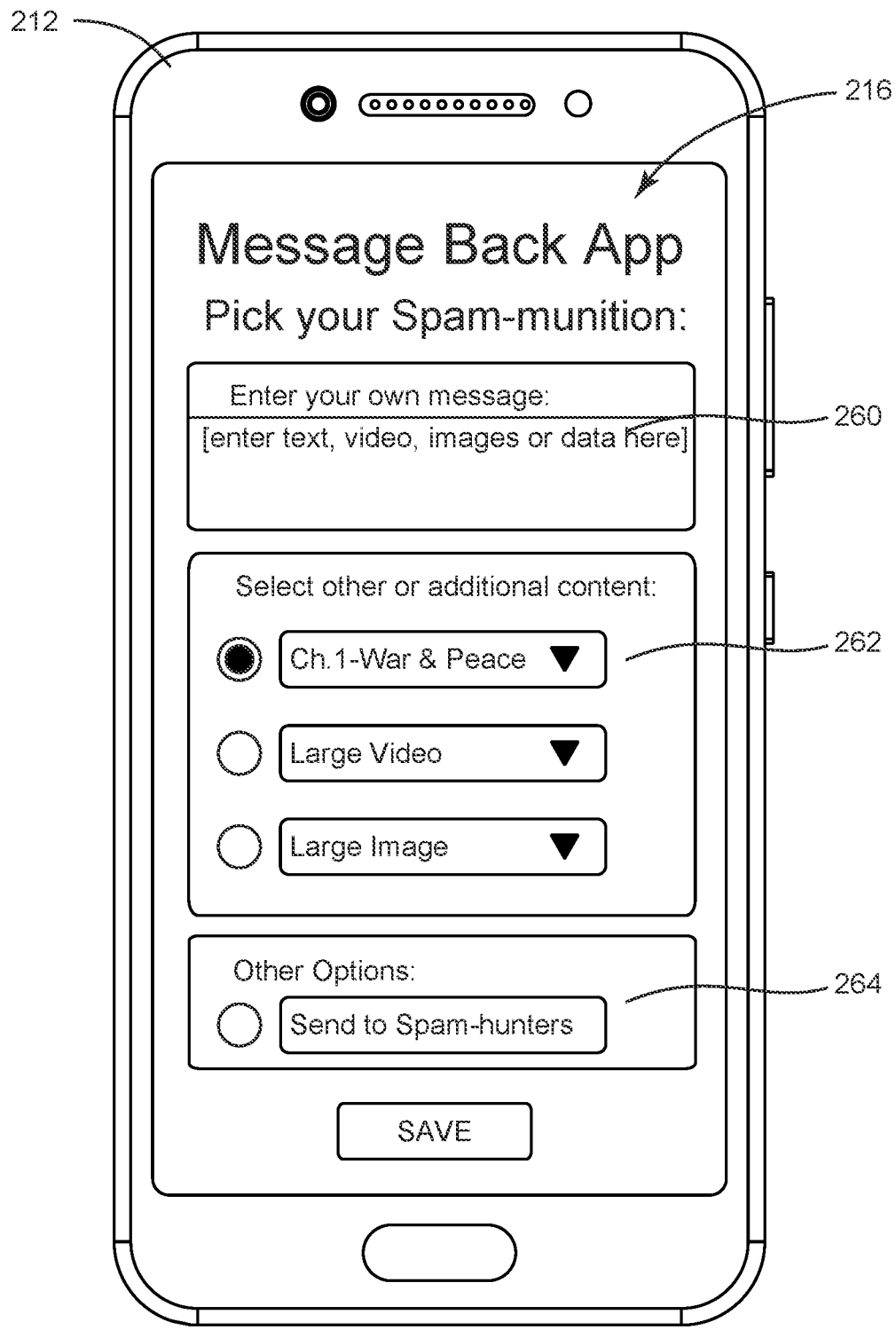
FIG. 6B shows a front view of a mobile device utilizing a message back application of a message back system for selecting content of messages to send back, according to an embodiment.

Step 256 of sending messages back to the source number may be accomplished in accordance with predetermined (default selections) or preselected preferences of the user. For example, and without limitation, the mobile device 212 operating message back application 216 may access the server 214 and communicate with server 214 operating message back utility 220. The message back application 216 may display a user interface that has selectable preferences. With reference to FIG. 6A, some of the selectable preferences may be provided in an interface that may include a "Number of Texts" interface 240, an "Interval Between Texts" interface 242, and/or an "Initiate Text Time" interface 244. With reference to FIG. 6B, some of the selectable preferences may be provided in an interface that may include an "Enter your own message" interface 260 and/or a "Select other and/or additional content" interface 262.

In an embodiment, the message back utility 220 may be programmed to send a certain number of texts back to the source phone number. For example, the message back utility 220 may be programmed to send a predetermined number of messages to the source phone number, and/or the message back utility 220 may be programmed to send a user-determined number of messages to the source phone number. The user-determined number of messages may be accomplished by use of message back application 216 operating on the mobile device 212 and in communication with the server 214 operating the message back utility 220. The message back application 216 may include the "Number of Texts" interface 240 for receiving input from the user and sending the user input to the server 214 for storage as a preference for the user of the mobile device 212. The stored preference may then be used by the system 210 during operation of the message back utility 220 to initiate the number of messages back to the source phone number as selected by the user (such as selecting between 210, 15, or 220 texts using radio buttons as depicted in FIG. 6A). The number of texts may be any number of texts as determined by the user and the number of texts and method of selection depicted in FIG. 6A are for exemplary purposes and are not provided as a limitation.

In an embodiment, the message back utility 220 may be programmed to send the programmed number of messages to the source phone number with certain timing or time intervals between each text of the number of texts. For example, the message back utility 220 may be programmed to send a predetermined time between each text of the number of texts to the source phone number, and/or the message back utility 220 may be programmed to send each text of the number of texts to the source phone number at a time interval between texts as selected by the user. The user-determined timing between texts may be accomplished by use of message back application 216 operating on the mobile device 212 and in communication with the server 214 operating the message back utility 220. The message back application 216 may include the "Interval Between Texts" interface 242 for receiving input from the user and sending the user input to the server 214 for storage as a preference for the user of the mobile device 212. The stored preference may then be used by the system 210 to initiate the number of texts to the source phone number at the time interval as selected by the user (such as selecting between 2 minutes, 5 minutes, or 210 minutes between texts using radio buttons as depicted in FIG. 6A). The time intervals may be any time interval selected by the user. The intervals and the method of selection depicted in and in FIG. 6A are for exemplary purposes and not as a limitation.

In an embodiment, the message back utility 220 may be programmed to initiate the programmed number of texts to the source phone number at a certain time. For example, the message back utility 220 may be programmed to initiate sending texts at a predetermined time and/or the message back utility 220 may be programmed to initiate sending the number of texts to the source phone number at a time selected by the user. The user-determined text initiating time may be accomplished by use of message back application 216 operating on the mobile device 212 and in communication with the server 214 operating the message back utility 220. The message back application 216 may include the "Initiate Text Time" interface 244 for receiving input from the user and sending the user input to the server 214 for storage as a preference for the user of the mobile device 212. The stored preference may then be used by the system 210 to initiate the number of texts to the source phone number at the time as selected by the user (such as selecting a time of initiation using a dropdown box as depicted in FIG. 6A). The time for initiating texts may be immediate or any time selected by the user. The method of selection depicted in FIG. 6A is for exemplary purposes and not as a limitation.

In an embodiment, the message back utility 220 may be programmed to include the content selected by the user, such as a user-entered text in "Enter your own message" interface 260 which includes adding custom text, video, images, or the like, to a message, including possible celebrity content, and/or selecting other or additional content from the "Select other or additional content" interface 262, which may include selection of content, such as large amounts of text, for example, and, without limitation, a chapter of a book, a large video file, a large image file, and/or the like, as shown in FIG. 6B. Various types of content may be selected in order to bombard the source identifier with large amounts of data and messages. In embodiments, the long text may be sent in chunks of appropriate message lengths for the messaging system, such as, but not limited to, 1600 characters, wherein the entire text passage is sent in several messages until the entire amount of text is sent to the source identifier. Further still, the user message back utility 220 may be programmed to include an option of sending Spam Source data, including the source identifier to a third party designated as spam-hunters, such as "Other options" interface 264. This allows for the third party to perform the task of sending robo messages back to the source identifier. This may require a fee from the user.

Figure 7A:
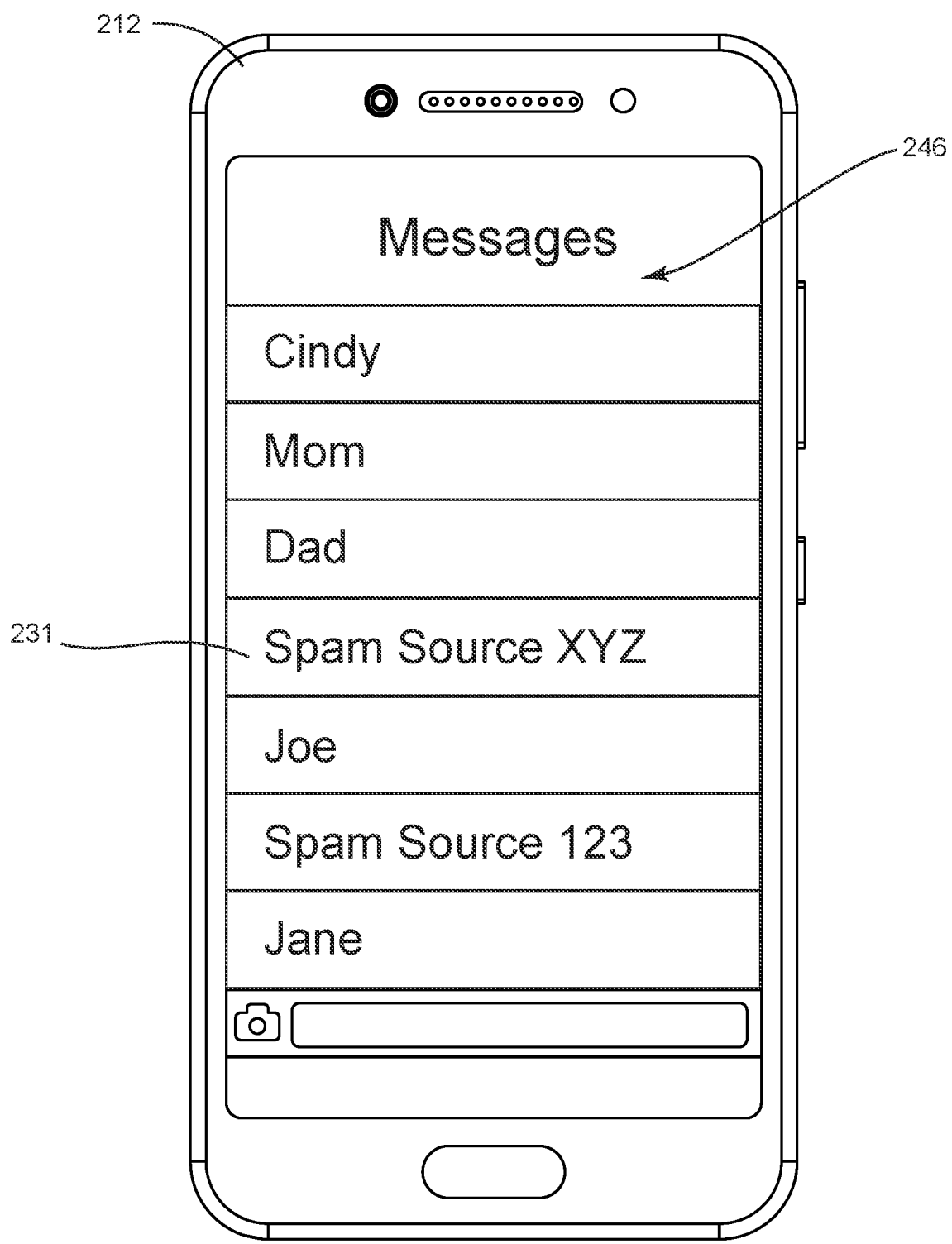
FIG. 7A shows a front view of a mobile device operating the system in a text messaging application, according to an embodiment.
Figure 7B:
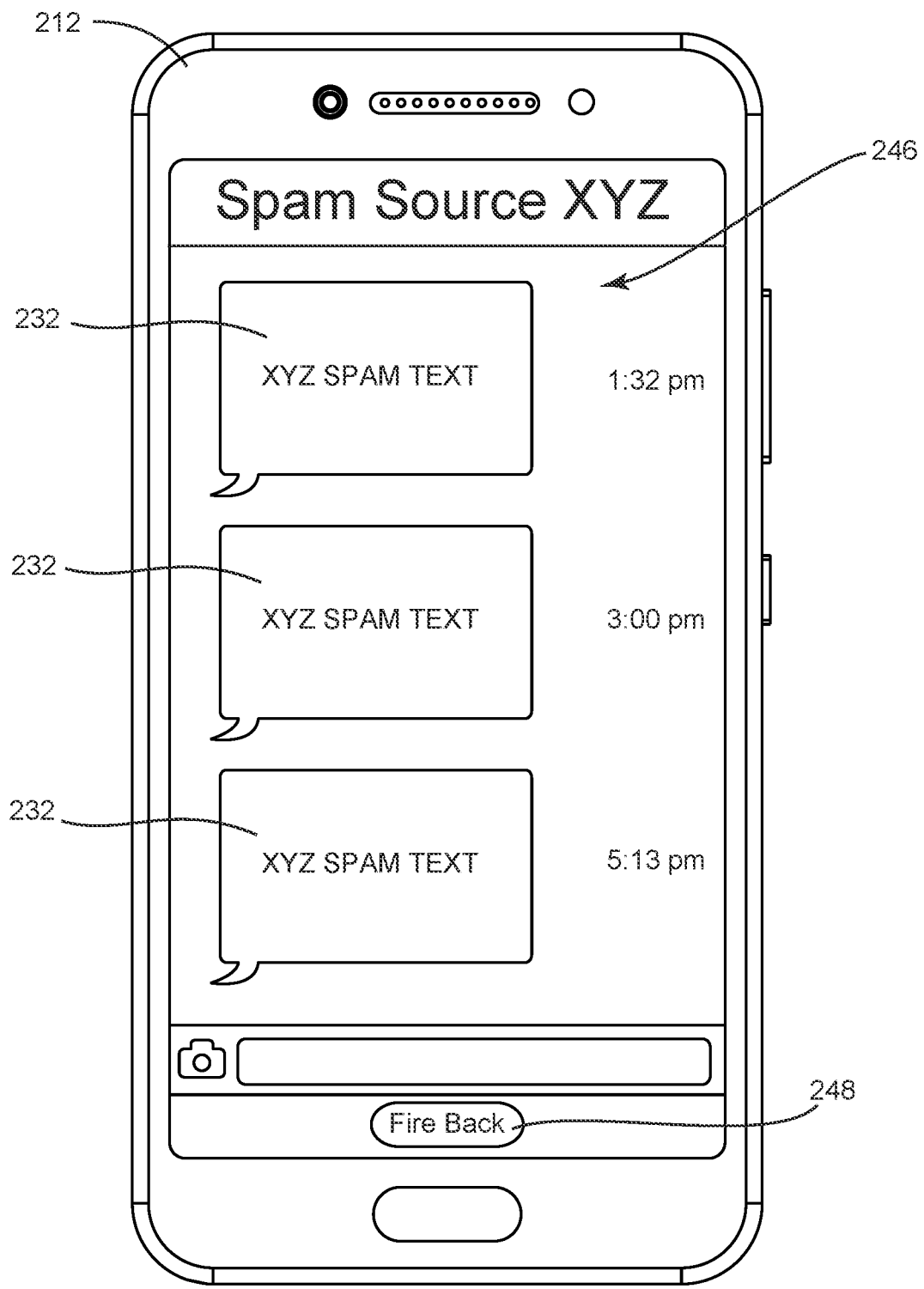
FIG. 7B shows a front view of a mobile device operating the system in a text messaging application, according to an embodiment.

Also, the user may manually activate the system 210 as frequently and as often as desired, to send out a response or responses to the source number, wherein the responses may be programmed and/or non-programed responses. For example, and without limitation, the system, as shown in FIG. 7A may include a list of messages received by the user computing device 212, wherein among the list of messages it includes at least one set of messages from a Spam Source 231. As the user selects the message or messages from Spam Source 231 is selected by the user, the user is directed to an interface such as that depicted in FIG. 7B. The system may include a manual activation button 248 that manually activates the system after receiving one or more robo message or spam messages 232 in the message application 246 (including native text messaging applications of a mobile device 212). The texts may or may not cause a distraction or a disruption to source entity 230, but they can make the recipient of robo messages or spam messages 232 feel like they have done something to push back against robo messages or spam messages 232 and source entity 230.

Further, in operation, the message back application 216 may further be programmed to automatically add the source number to a do not call list or block list in response to sending the source number from the mobile device 212 to the server 214 for storage. Additionally, the system 210 may be programmed to automatically notify the server 214 from the mobile device 212 any time the mobile device receives a text from the source number on the do not call or block list. In these embodiments, the server 214 may operate under the instruction programmed in the message back utility 220 automatically without additional input from the user through the mobile device 212.

Embodiments may be available on or through the internet, such as through domain names reserved and owned by Applicant that include flipthespam.com, RoboBack.com, Robo-Back.com, BotBack.com, Bot-Defense.com, Robo-Defense.com, Robo-Answer.com, voip-back.com, spam-back.com, ashotback.com, shot-back.com, spam-boomerang.com, spam-munition.com or the like.

It will be understood that the message back system 210 may operate as a computing device being programmed to perform the functions described in this disclosure. As such it will be appreciated, by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special-purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A message back system, comprising:
a server having a memory storing source information relating to entities engaged in spam messaging and storing a message back utility with programmed instructions executable by the server; and a mobile device operating a message back application, wherein operation of the message back application couples the mobile device with the server and the message back application includes programmed instructions executable by the mobile device, wherein:

the mobile device is programmed to automatically send to the server a source information including a source number associated with a source of spam messages for storage in the memory of the server in response to activation of the system by user input on the mobile device;

the server is programmed to store the source information and to generate and send one or more messages to the source number of the source according to predefined preferences; and the mobile device is further programmed to send one or more additional messages to the source number of the source in response to additional activation of the system by user input on the mobile device.

2. The system of claim 1, wherein the message back utility is programmed to include a user-determined number of messages to send to the source number.

3. The system of claim 2, wherein the message back utility is programmed to include a user-determined time of day to initiate the sending of the number of messages.

4. The system of claim 2, wherein the message back utility is programmed to include a user-determined time interval between each message of the number of messages.

5. The system of claim 1, wherein the mobile device is further programmed to automatically add the source number to a block list.

6. The system of claim 5, wherein the mobile device is further programmed to automatically send a notification to the server in response to receiving a message from the source number in the block list.

7. The system of claim 6, wherein the server is further programmed to automatically send a message to the source number in accordance with predefined preferences in response to receiving and processing the notification from the mobile device.

8. The system of claim 1, wherein each message sent by the server to the source number includes a large amount of text, multimedia files including large video files and a large image file or a combination of large text and large multimedia files.

* * * * *